(No Model.)

D. B. HAMILTON.
Gate.

No. 234,471. Patented Nov. 16, 1880.

WITNESSES
Fred. G. Dieterich
P. C. Dietrich.

David B. Hamilton
INVENTOR,
by Louis Bagger & Co.
ATTORNEYS.

N. PETERS, PHOTO-LITHOGRAPHER, WASHINGTON, D. C.

UNITED STATES PATENT OFFICE.

DAVID B. HAMILTON, OF FLETCHER, OHIO.

GATE.

SPECIFICATION forming part of Letters Patent No. 234,471, dated November 16, 1880.

Application filed April 23, 1880. (No model.)

*To all whom it may concern:*

Be it known that I, DAVID B. HAMILTON, of Fletcher, in the county of Miami and State of Ohio, have invented certain new and useful Improvements in Gates; and I do hereby declare that the following is a full, clear, and exact description of the invention, which will enable others skilled in the art to which it appertains to make and use the same, reference being had to the accompanying drawings, which form a part of this specification, and in which—

Figure 1:
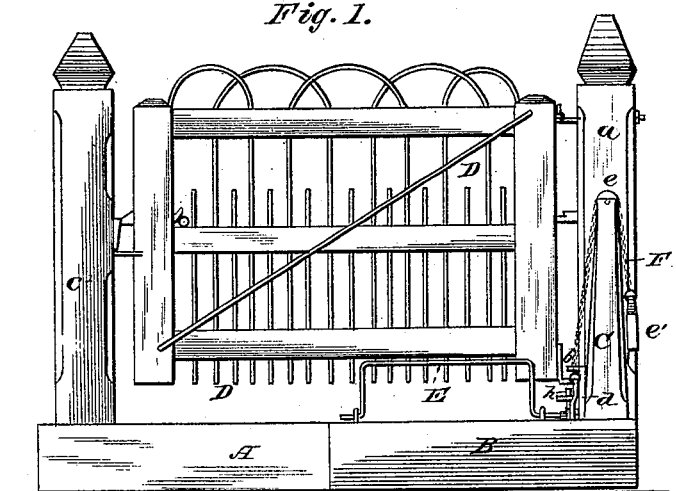
Figure 2:
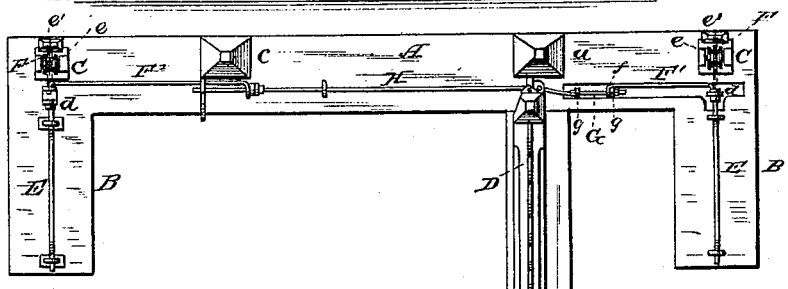
Figure 3:
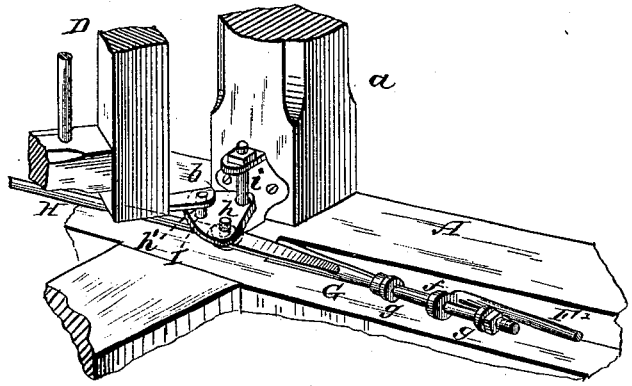
Figure 4:
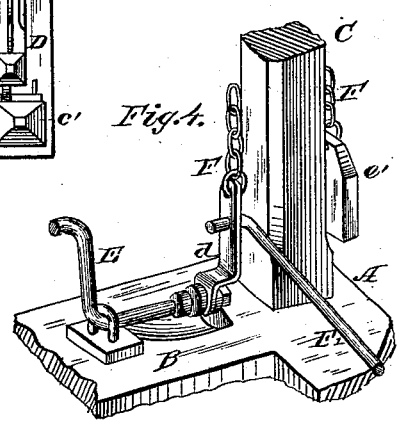

Figure 1 is a front or face view of my improved gate. Fig. 2 is a plan of the same, with its operating mechanism; and Figs. 3 and 4 are perspective detail views of the gate-pintle with its trip-plate and operating crank-rods.

Similar letters of reference indicate corresponding parts in all the figures.

My invention has relation to automatic swinging gates; and it consists in the detailed construction and combination of parts hereinafter described, and particularly pointed out in the claim.

In the accompanying drawings, A refers to a long base-piece or sill let into the ground at right angles to the gate, and B B refer to two short pieces, one set in the ground on each side of and parallel with the gate, while at their points of conjunction with the piece A are placed posts C C, the function of which will be seen hereinafter.

D is the gate, suitably hung at its upper end to the hinge-post $a$, with its lower end provided with a hinge pivot-strap, $b$, which is inserted upon a stud or pivot-pin, $h'$, secured in the trip-plate I, (see Fig. 3,) which said trip-plate is of a sector shape and provided with a pintle, $i$, and stud $h$, opposite to the hinge stud or pivot $h'$.

If desired, the hinge-strap may be made with a pivot-stud, which is, in that case, inserted into a perforation in the trip-plate, the manner of operating the lower gate-hinge being in both cases alike.

E E are cranks, hinged or pivoted in the pieces B in line with the carriage or vehicle way, with one end connected to or provided with cranks or arms $d$ $d$, secured at right angles to the rod portions of said cranks, and about parallel with the cranks themselves, as clearly shown.

Attached to the upper end of each of the crank-arms $d$ is a chain, F, passing over a grooved pulley, $e$, in the upper ends of the posts C C, and having attached to its free end a weight, $e'$, the function of which is to keep the cranks E upright, and when depressed to return them to such position, ready for the action of the wheel or wheels of the next passing vehicle. The middle part of one of these crank-arms $d$ is connected to a short rod, F′, whose opposite end has an eye, $f$, which travels or moves upon a second short rod, G, back and forth between shoulders $g$ $g$, spaced sufficiently apart upon rod G to permit the crank-arms $d$ to have a greater or less inclination as the cranks E are acted on before striking or coming into contact with said shoulders, and to overcome direct thrust at the points of conjunction between said rods, and provide for converting the curvilinear motion of the crank-arms $d$ into a longitudinal motion, and transmitting such motion to the gate-actuating rods. This arrangement is the same at the other side of the gate, excepting a long rod, H, extending therefrom, connects with the rod G, whose outer end is perforated and inserted upon the stud $h$ of the trip-plate I, which said stud also receives the perforated end of rod H, and thus serves to couple the two rods together and connect both of them to the trip-plate I at a point opposite to the lower gate pivot or hinge, $h'$.

I am aware that trip-plates for operating swinging gates have been used before in combination with actuating rods and cranks; but

What I claim as my improvement, and desire to secure by Letters Patent of the United States, is—

In combination, the swinging gate D, with its lower hinge, $b$, and hinge-post $a$, sector-shaped trip-plate I, having pintle $i$ and studs $h$ $h'$, operating-rods G H, coupled to the connecting-rods F′ F², cranks E, lever-arms $d$, and their operating weighted chains F, substantially as and for the purpose herein shown and specified.

In testimony that I claim the foregoing as my own I have hereto affixed my signature in presence of two witnesses.

DAVID B. HAMILTON.

Witnesses:
M. DUNCAN,
JOHN B. RANDOLPH.